United States Patent [19]

Ceaser

[11] 4,436,645

[45] Mar. 13, 1984

[54] FLUORIDE CONTAINING COMPOSITIONS FOR REMOVAL OF POLLUTANTS FROM WASTE WATERS AND METHODS OF UTILIZING SAME

[76] Inventor: Anthony V. Ceaser, Cemetary Rd., Great Meadows, N.J. 07838

[21] Appl. No.: 424,902

[22] Filed: Sep. 27, 1982

[51] Int. Cl.³ ............................. C02F 1/52; C02F 1/62
[52] U.S. Cl. ....................................... 252/179; 252/60; 252/175; 210/679; 210/684; 210/751; 210/753; 210/909; 210/913; 106/89; 106/109; 502/60; 502/84
[58] Field of Search .................. 252/60, 175, 179, 449, 252/454, 455 Z; 210/679, 684, 751, 753, 909, 913; 106/89, 109

[56] References Cited

U.S. PATENT DOCUMENTS

| | | |
|---|---|---|
| 3,677,939 | 7/1972 | Patil et al. ............................. 210/679 |
| 3,947,283 | 3/1976 | Uchikawa et al. .................... 210/751 |
| 3,947,284 | 3/1976 | Kitsugi et al. ........................ 210/751 |
| 4,035,259 | 7/1977 | Casale .................................. 252/175 |
| 4,098,714 | 7/1978 | Derleth et al. ....................... 252/175 |
| 4,113,504 | 9/1978 | Chen et al. ........................... 210/751 |
| 4,116,705 | 9/1978 | Chappell .............................. 210/751 |
| 4,124,405 | 11/1978 | Quiénot ............................... 210/751 |
| 4,149,968 | 4/1979 | Kupiec et al. ........................ 210/751 |

Primary Examiner—John E. Kittle
Assistant Examiner—Robert A. Wax
Attorney, Agent, or Firm—Omri M. Behr

[57] ABSTRACT

Novel compositions containing fluoride are provided for the removal of organic and heavy metal pollutants from waste waters and methods of utilizing same. The compositions comprise components selected from ion exchange absorbent gels, cements, water soluble fluoride containing salts and optionally alkali metal ortho phosphates. The procedures of the present invention yield not only clarified waters but provided a sludge which can be disposed of under environmentally acceptable conditions.

10 Claims, No Drawings

FLUORIDE CONTAINING COMPOSITIONS FOR REMOVAL OF POLLUTANTS FROM WASTE WATERS AND METHODS OF UTILIZING SAME

BACKGROUND OF THE INVENTION

Much attention has been given in recent years to the purification of waste waters containing environmentally damaging pollutants such as heavy metals and organic compounds such as found in petroleum wastes. In order to return such waste waters into the environment it is necessary to remove the pollutants in order to reduce environmental contamination. Acceptable methods of treatment include procedures which not only reduce the pollutant level of the treated waters to an environmentally acceptable standard but also to provide a means of disposing of the removed pollutant materials in a manner which would not of itself thereafter contaminate the environment.

Many procedures are known, however, the most efficient of these procedures involve the use of expensive, substantially continuous plant installations. A need therefore exists for procedures involving relatively inexpensive treatment compositions which can be adapted not only for continuous use but for batch use as well. Ideally such material should yield a product which is relatively easily dewaterable and which has very low environmental leach characteristics.

The current standards for non-hazardous solid waste in drinking water are found in the U.S. Environmental Protection Agency publication: EPSW 846 "Test Methods for Evaluating such Wastes" Section 7: Extraction procedure, Toxicity Section 7.1-3; Structural Integrity procedure Section 7.1-8.

SUMMARY OF THE INVENTION

The present invention comprises the provision of a novel multi component composition which will very rapidly remove heavy metal, organic, or petroleum based pollutants from waste waters and which will provide a residue which meets environmental disposal standards.

The compositions of the present invention comprise three groups of components and optionally a fourth. The primary group comprises ion exchange absorbent gels consisting of at least one member of the group of Clays, preferably calcined clays, silicas, suitably amorphous silicas, such as diatomaceous earths, aluminas, natural or artificial zeolites, perlites or vermiculite. The second group comprises cementitious materials such as cements, for example, Portland, aluminous and puzzalan cements, gypsum plaster, and alkaline earth metal oxides suitably hydrated oxides. The third component comprises water soluble fluoride salts; the optional component comprises alkali metal ortho phosphates. While, under certain circumstances, the presence of the phosphate is not critical, and the compositions are operative without it, its presence substantially enchances the efficiency of the system.

In carrying out the process of the present invention, the polluted waters are contacted with the treatment compositions in a ratio of composition to pollutant in the range of 5:1 through 25:1.

The water clean-up step is virtually instantaneous. It has been found, however, that for environmentally acceptable disposal of the residue, namely the product of the treating composition and the pollutant, a setting time is desirable. While no minimum setting time has been determined it has been found that a setting time of 24 hours is adequate to meet Environmental Protection Agency leaching standards. In carrying out the procedures of the present invention, the cure of the residue may be effected by leaving the residue in contact with the purified waters for 24 hours or by separating the major portion of the purified waters, allowing the residue to cure and thereafter dewatering same prior to disposal of the residue. No difference in the environmental acceptability of the residue has been found.

DESCRIPTION OF THE PREFERRED EMBODIMENTS

The present invention is particularly concerned with the treatment of waste waters which contain as pollutants the following types of materials.

(1) heavy metals, i.e. copper, chromium, zinc, lead, molybdenum, tungsten, manganese, iron, cobalt, mercury, arsenic, nickel and titanium ions;

(2) organic water-miscible substances, such as phenols, i.e., catechol or stearates.

(3) organic water-immiscible substances which form emulsions or slicks with water, i.e. petroleum distillates and (4) water soluble inorganic ions, such as cyanide.

The compositions which are utilized in the present invention comprise mixtures of at least three components selected from the following groups of components:

(a) ion exchanging absorbent gels. This group includes clays most suitably calcined clays, silicas suitably amorphous silica such as diatomaceous earths, alminas, natural and synthetic zeolites, perlite or vermiculite. These materials may comprise between 15 and 55% by weight of the total compositions.

(b) cementitious materials such as cements, including portland, aluminous, and puzzalan cements, gypsum plaster, alkaline earth metal oxides or alkaline earth metal hydrated oxides. This group may comprise between 30 and 80% of the mixture.

(c) water soluble fluoride containing salts most suitably ammonium bifluoride ($NH_4 \cdot HF_2$), zinc fluorosilicate $(Zn)SiF_6$, magnesium fluorosilicate ($MgSiF_6$), zinc fluoro borate ($3ZnF_2 \cdot 2B_2O_3$) and potassium fluoride ($KF$) and stannousfluoride ($SnF_2$) may be particularly mentioned but should not be considered as exclusive and (d) alkali ortho phosphates most preferably sodium ortho phosphate.

It is not critical that phosphates be included for the compositions to be operative, however, where up to 20% of the total weight of the composition of phosphate is present the efficiency of the process is substantially improved.

It is required within the scope of the present invention that the composition contain a source of fluoride ions, and, where no phosphate is present either clay, or a further group (b) component, preferably between 20 and 30% by weight is required.

As the cementitious component there may be employed either a cement or a gypsum, however, this should be supplemented by a fourth component taken from either group (a) for example, diatomaceous silica or from the cementitious group, (b) for example, hydrated lime, in each it is preferred that this fouth component be present in the same proportion (approximately) as the clay component.

Where no phosphate and no group (a) components are present three components may be selected from group (b). In this case at least two of three components should be cementitious materials which also have ion exchanging properties such as cements or gypsum.

In carrying out the process of the present invention it is desirable to have an approximate idea of the pollutant proportion. The amount of treatment composition utilized should lie between 5 parts of treatment composition to one of pollutant through to 25 parts of treatment composition to one part of pollutant. The higher proportions should be utilized either where very low heavy metal residues in the clarifying waters are required or else where the organic pollutants have dye qualities. In carrying out the process of the present invention the components are mixed at ambient temperature. Removal of heavy metals is substantially instantaneous, while removal of organics may require up to 72 contact hours although in most circumstances 24 hours of contact is sufficient. At the option of the operator the clarified waters may be separated from the residue but the residue should be permitted to cure for at least 24 hours prior to dewatering and disposal.

EXAMPLE 1

To an artificial waste water containing 4000 ppm chromium ion, 1600 ppm copper ion and 3,300 ppm catechol is added, with stirring, a treatment composition containing 37.0 grams Portland cement
28.0 grams Clay (bentonite)
28.0 grams diatomaceous silica
7.0 grams zinc fluorosilicate After allowing the artificial waste water and treatment composition to stand for 48-72 hours, the water and sludge are separated. The clarified water was found to contain 0.8 ppm chromium ion, less than 2 ppm copper ion and less than 2 ppm of catechol. The sludge is found to be resistant to the E.P.A. leaching test EPSW 846: Extraction Procedure Toxicity Reaction 7.1-3.

EXAMPLE 2

One thousand milliliters of potable water and 11.78 grams of crystal copper sulfate are mixed to provide a "waste water" containing 2,000 ppm copper. To this "waste water" solution is added, with stirring, a treatment composition containing 15.60 grams Portland cement
23.60 grams Calcined Georgia clay
10.0 grams trisodium phosphate
0.8 grams magnesium fluorosilicate The "waste water" is allowed to stand for 48-72 hours with the treatment composition. Then, the water is separated from the sludge. Both are tested to determine copper content. The clarified water was found to contain 2.8 ppm copper. The E.P.A. extracted sludge released 3.7 ppm copper.

EXAMPLE 3

In 3,340 milliliters potable water, there is dissolved 60.0 grams copper sulfate crystals, 0.1 gram fluorescent tracer dye, 1.0 gram alkyl aryl sulfonate wetting agent, 90.0 grams sodium chloride, 30.0 grams chrome alum crystals and 10.0 grams catechol to form an artificial waste. The solution, a dark foamy solution with considerable phenol odor, is allowed to stand 48 hours and is then treated for 48-72 hours with a treatment composition containing 53.4 grams Portland cement
80.8 grams Calcined clay
30.0 grams trisodium phosphate
5.3 grams ammonium bifluoride After treatment, the water is separated from the sludge. Both are tested to determine their pollutant content. The clarified water was found to contain 4.2 ppm copper, 2.5 ppm phenol and 0.14 ppm chromium. The E.P.A. extracted sludge released 3.5 ppm copper, 1.3 ppm phenol and 0.0 ppm chromium.

EXAMPLE 4

In 1000.0 ml potable water is dissolved 20.0 gram chrome alum crystals so as to provide a "waste water" containing 2,000 ppm Chromium. To this "waste water" is added, with stirring, a treatment composition containing 23.4 grams Portland cement
35.4 grams Amorphous silica
10.0 grams trisodium phosphate
1.2 grams sodium bifluoride After treatment for 48-72 hours, the water is separated from the sludge. Both are tested to determine chrome content. The clarified water was found to contain 0.8 ppm chrome. The E.P.A. extracted sludge released 0.93 ppm chrome.

EXAMPLE 5

Two hundred pounds water, 200 pounds petroleum distillate (boiling point, 270° C.), 5.0 pounds nonionic wetting agent Igepal Co530 and 0.2 pounds sodium alginate is emulsied with high speed stirring to form a stable emulsion of "artificial water". To this is added, with slow speed stirring, a treatment composition containing 320.0 pounds gypsum plaster
40.0 pounds calcined clay
40.0 pounds hydrated lime
2.0 pounds ammonium bifluoride This produced a smooth easy-flowing paste that was dumped and set in 30 minutes to a hard, rock-like consistency. This product passes the E.P.A. Structural integrity test and when extracted released less than 1% of the petroleum distillate.

EXAMPLE 6

Two hundred pounds water, 200 pounds petroleum distillate (boiling point, 270° C.), 5.0 pounds nonionic wetting agent Igepal Co530 and 0.2 pounds sodium alginate is emulsified with high speed stirring to form a stable emulsion of "artificial water". To this is added, with slow speed stirring, a treatment composition containing 16.0 pounds gypsum plaster
16.0 pounds portland cement
8.0 pounds hydrated lime
4.0 pounds magnesium fluoro silicate This produced a smooth easy-flowing paste that was dumped and set in 30 minutes a hard, rock-like consistency. This product passes the E.P.A. Structural integrity test and when extracted releases less than 1% of the petroleum distillate.

EXAMPLE 7

Repetition of each of the foregoing Examples 2 through 5 without the fluoride salt results in sludge products which upon E.P.A. extraction, released from 100 to 500 times the amount of toxin as did the corresponding example containing the fluoride salt.

I claim:

1. A composition adapted to the removal of heavy metal, water soluble, water immiscible and water immiscible organic pollutants from waste waters comprising
   (a) ion exchange absorbent gels, consisting of at least one member selected from the group consisting of calcined clays, amorphous silicas, aluminas, natural and artificial zeolites, perlites or vermiculite,
   (b) cementitious materials selected from the group consisting of Portland cements, aluminous cements, puzzalan cements, gypsum plasters, alkaline earth metal oxides and alkaline earth metals hydrated oxides,
   (c) water soluble fluoride containing salts, and
   (d) alkali metal ortho phosphates, provided that where no alkali metal ortho phosphate is present an additional component is selected from group (a) or group (b), further provided that where no alkali metal ortho phosphate or group (a) components are present, three components are selected from group (b).

2. A composition in accordance with claim 1 wherein the absorbent gels of group (a) comprise between 15 and 55% by weight of the total composition, the cementitious materials of group (b) comprise between 30 and 80% by weight of the total composition, the fluoride containing salts comprise between 0.3 and 10% by weight of the total composition and the alkali earth metal ortho phosphate comprises between 0 and 20% by weight of the total composition provided that where no phosphate is present the fourth component selected from group (a) or group (b) should comprise substantially the same proportion of the total composition as the initial component selected from group (a).

3. A composition in accordance with claim 1 comprising no group (a) components, three materials of group (b) comprising between 90 and 99.7% by weight of the total composition, the fluoride containing salts comprise between 0.3 and 10% by weight of the total composition and comprising no alkali metal ortho phosphate.

4. A composition in accordance with claim 2 wherein the fluorides are selected from the group consisting of magnesium or zinc fluoro silicate, zinc fluoro borate, ammonium bifluoride, potassium fluoride and stannous fluoride.

5. A composition according to claim 1 which comprises substantially
   76% gypsum;
   19% 50:50 mixture calcined clay and lime; and
   0.4% ammonium bifluoride.

6. A composition according to claim 2 which comprises substantially
   37% Portland cement;
   28% clay (bentonite);
   28% diatomaceous silica; and
   7% zinc fluorosilicate.

7. A composition according to claim 2 which comprises substantially
   31% Portland cement;
   47% calcined clay;
   20% trisodium phosphate; and
   2% magnesium fluorosilicate.

8. A composition according to claim 2 which comprises substantially
   31.5% Portland cement;
   47.5% Calcined clay;
   18% trisodium phosphate; and
   3% ammonium bifluoride.

9. A composition according to claim 2 which comprises substantially
   33% Portland cement
   50% Calcined clay;
   14% trisodium phosphate; and
   2% sodium bifluoride.

10. A composition according to claim 3 comprises substantially
    39.5% Portland cement
    39.5% gypsum plaster
    19.8% hydrated lime
    1% magnesium fluoro silicate.

* * * * *